United States Patent [19]

Overbury

[11] 4,047,177
[45] Sept. 6, 1977

[54] DOPPLER SCANNING GUIDANCE SYSTEM RECEIVER

[75] Inventor: Francis G. Overbury, Cuffley, England

[73] Assignee: International Standard Electric Corporation, New York, N.Y.

[21] Appl. No.: 637,941

[22] Filed: Dec. 5, 1975

[30] Foreign Application Priority Data

Dec. 23, 1974 United Kingdom ............... 55381/74

[51] Int. Cl.² .............................................. G01S 5/02
[52] U.S. Cl. ......................... 343/113 DE; 343/106 D; 325/419
[58] Field of Search ..................... 343/106 D, 113 DE; 325/419; 329/124

[56] References Cited

U.S. PATENT DOCUMENTS

| 3,691,560 | 9/1972 | Hammack | 343/113 DE |
| 3,893,118 | 7/1975 | Overbury | 343/106 D |

FOREIGN PATENT DOCUMENTS

| 1,387,249 | 3/1975 | United Kingdom | 343/113 DE |

Primary Examiner—Maynard R. Wilbur
Assistant Examiner—T. M. Blum
Attorney, Agent, or Firm—William T. O'Neil

[57] ABSTRACT

A received signal processor in a remote receiving (airborne) station including amplitude modulation elimination means for improving the determined value of Doppler beat, angle representing signal, generated from reception of the transmissions of a Doppler Scanning (ground) Beacon station, for enhancing the accuracy of air derived angle data in the presence of near-angle multipath signal.

4 Claims, 1 Drawing Figure

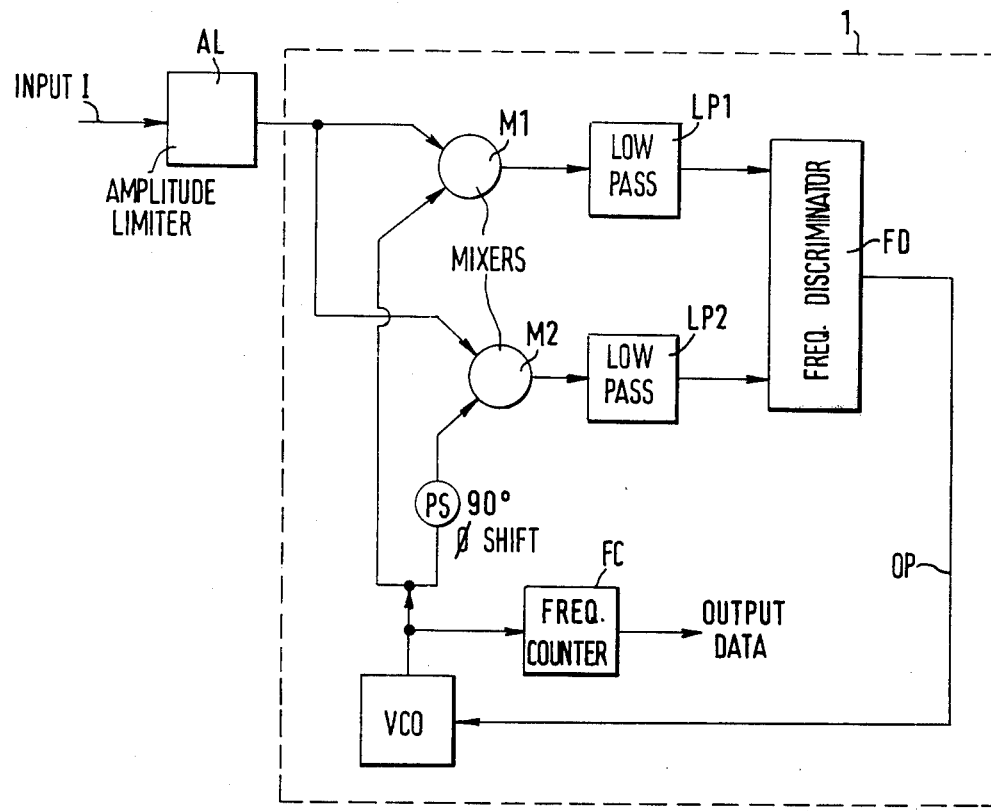

DOPPLER SCANNING GUIDANCE SYSTEM RECEIVER

BACKGROUND OF THE INVENTION

1. Field of the Invention

The present invention relates generally to electronic aids to navigation, and more specifically to (simulated) Doppler Scanning systems for aircraft landing approach guidance.

2. Description of the Prior Art

In the prior art the so-called Doppler navigation systems are extensively described in the technical and patent literature. The basic system to which the present invention applies is well described in the technical paper "Doppler Scanning Guidance System" by C. W. Earp, F. G. Overbury and P. Sothcott, published in the periodical "Electrical Communication", Vol. 46 (1971), No. 4, pp. 253 to 270.

Basically the aforementioned prior art systems utilize a ground transmitter and a linear antenna having plural separately-excited radiation elements, the signal transmitted being applied successively by a commutator to the radiator elements to simulate, for a reception point located at a distance therefrom, an antenna moving along the axis of the array. That arrangement is commonly called the Doppler (ground) Beacon.

The bearing (or elevation angle) with respect to the array is defined by the frequency of the commutated wave emitted in that direction, i.e. the angular information is coded in terms of frequency.

A remote receiver of the system includes a frequency selective network for tracking, i.e. acquiring and locking on to, the major frequency spectrum of the received signal. After certain signal processing via r.f. and detector stages, a Doppler beat frequency signal is derived and is indicative of the angle.

One of the most serious problems affecting the accuracy of angle determination in systems of the aforementioned type is the problem of multi-path signals reaching the remote receiver. The process of developing the so-called beat, and therefrom its analog, which is the desired angle information, is an air-derived process. Accordingly, the angle-coded ground Doppler Beacon signals may be received, not only directly by line-of-sight, but also by reflection from the ground or various manmade or natural obstacles near the approach path.

Under most conditions, these multipath components are sufficiently well spaced from the main angle information component for the frequency selectivity of the tracking filter to substantially eliminate them and therefore all errors caused by the multipath components. However, there are conditions, especially relevant to elevation systems, where a multipath component is close in frequency to that of the desired direct signal and of an amplitude approaching that of the desired signal, e.g. relative amplitude 0.7 to 1.

In elevation Dopper systems, since the transmission is in the form of a fan beam, a reflecting object, such as a hangar, at the side of the runway, although at a relatively wide angle in azimuth from the glidepath, may cause a multipath component to occur which is of relatively high amplitude and as close as ½° angular separation vis-a-vis the true (direct path) elevation angle.

In an aircraft borne system receiver, flying along the glidepath, the relative path length changes causing cycling between peak positive and peak negative errors. Although the movement of the receiver is ordinarily fast enough to smooth out the instantaneous errors, the mean error is not zero, and this results in an error being introduced into the count made in frequency tracking circuits.

The manner in which the present invention deals with this problem will be understood as this description proceeds.

SUMMARY OF THE INVENTION

The present invention comprises a receiving system for use in a receiver responsive to Doppler Scanning Beacon transmissions for angle determinations including an amplitude limiter inserted so as to be operative at the signal input to the frequency tracking circuits to eliminate amplitude modulation components of the input signal to be frequency tracked. The beat frequency counting process then responds substantially only to the frequency resulting for a phase modulation capture effect and is not substantially by the aforementioned cycling errors. The accuracy of angle determination is thereby enhanced.

BRIEF DESCRIPTION OF THE DRAWINGS

A single FIG. drawing shows the circuit for Doppler beat signal processing in a remote receiving system, including the means for amplitude modulation elimination according to the invention.

DESCRIPTION OF THE PREFERRED EMBODIMENT

Referring now to the single figure, the essentials of the present invention will be described.

One form of frequency selective network suitable for use in airborne Doppler navigation receivers is the zero-intermediate-frequency tracking oscillator, shown within the block 1 of the accompanying drawing. The received signal at suitably amplified level is passed simultaneously to two mixers M1 and M2. The first mixer M1 has, as its other input, the output of a variable frequency oscillator (voltage controlled oscillator) VCO, and the second mixer M2, has as its other input, the output of the oscillator VCO shifted 90° by phase shifter PS, i.e. in phase quadrature with the other input to the first mixer M1. The two mixer outputs are at IF frequency and are passed to respective low pass filters LP1 and LP2, for the elimination of most multipath components, and thence to a frequency discriminator circuit FD which has an output OP controlling the frequency of the oscillator VCO in such a manner as to obtain a zero IF when the major component of the input signal is being tracked.

In the Doppler Scanning Beacon of a system of the present type, it is useful to recall that the main angle information signal transmitted through the linear array RF energized cyclically one element at a time to produce the simulated Doppler effect is seen by the remote (airborne) station with a Doppler component which is a function of the angle between the line of the array and the line of approach (course). For the most effective resolution of the relatively small variations (due to course changes) in the Doppler component, an offset reference signal is also transmitted, and it is the beat between these two signals in the remote receiver which is measured (counted) to give the desired angle information. Both carriers (ref. and main bearing signal) are are extant at the M1 and M2 inputs.

The I and Q mixers M1 and M2 are both referenced against the same VCO frequency, and their output signals (limited to an expected range of useful beat frequencies by LP1 and LP2) contain the aforementioned beat which is demodulated from the IF carrier by discrimination FD.

The described system is sometimes referred to as a "zero intermediate frequency" tracking arrangement.

As aforesaid, in a Doppler scanning guidance system of the type being considered, there exists the possibility of the received signal comprising not only the directly propagated discrete bearing information frequency signal, but also multipath components (by reflection).

As also aforesaid, the mean error between the extremes of cyclical instantaneous amplitude fluctuation into the discriminator FD due to the hereinbefore described near-angle multipath spurious signal produces a correspondingly varying VCO signal, since the discriminator is amplitude sensitive as well as frequency/phase sensitive. Since it is the VCO output (the aforementioned beat) which is counted by FC to determine angle, the error (average) is reflected directly into the angle measurement.

To bring the aforementioned mean error due to amplitude modulation at the input I, an amplitude limiter AL of a classical type is introduced ahead of the mixers $M_1$ and $M_2$ as shown, to suppress the amplitude variations. The response of FD is therefore free of error because of amplitude variations, and the count of FC is determined substantially only by capture process of the phase modulation (typical of phase-lock loop theory).

It is to be understood that the drawing and this description of a specific example of implementation of this invention are presented by way of example only and are not to be considered as limiting the scope of the invention.

What is claimed is:

1. In a Doppler scanning guidance system receiver responsive to Doppler scanning ground Beacon transmissions including a main bearing signal and an offset reference signal, the combination comprising:
   first means comprising a phase-lock loop, said loop including mixing means responsive to said main and reference received signals in a predetermined frequency band, a frequency discriminator responsive to said mixing means output, and a variable frequency oscillator responsive to a frequency controlling signal derived by said discriminator, said oscillator providing a local oscillator signal to said mixing means;
   and second means operative at the input of said mixing means for suppressing amplitude variations to suppress the effect of near angle multipath interferences which cause amplitude variations at said input.

2. Apparatus according to claim 1 in which said mixing means comprises first and second mixers each responsive to said received signals, said first mixer being provided the output of said variable frequency oscillator as a local oscillator signal, and in which a 90° phase shifter responsive to said tracking oscillator is included, said phase shifter providing the local oscillator signal to said second mixer, a beat signal thereby being continuously extant as a modulation component at the input of said discriminator and including means for frequency counting said beat for angle determination.

3. Apparatus according to claim 2 in which a pair of low pass filters is included, one of said filters being connected between the output of each of said mixers and a corresponding input of said discriminator.

4. In a Doppler scanning guidance system receiver, the combination comprising:
   a zero intermediate frequency tracking oscillator arrangement connected for tracking the Doppler angular information signal demodulated by said receiver;
   and an amplitude limiter operative at the input of said tracking oscillator arrangement for suppressing amplitude modulation components otherwise present in said information, said tracking oscillator thereby being responsive substantially only to phase modulation effects.

* * * * *